Oct. 8, 1963

R. A. COTTON 3,106,377

LASHING ANCHORAGE FOR FREIGHT STOWAGE COMPARTMENTS
OF AIRCRAFT AND OTHER VEHICLES

Filed Jan. 18, 1962

Inventor
Raymond Arthur Cotton
By Cushman, Darby & Cushman
Attorneys

United States Patent Office 3,106,377
Patented Oct. 8, 1963

3,106,377
LASHING ANCHORAGE FOR FREIGHT STOWAGE COMPARTMENTS OF AIRCRAFT AND OTHER VEHICLES
Raymond Arthur Cotton, Newtownards, Northern Ireland, assignor to Short Brothers & Harland Limited, Belfast, Northern Ireland, a company of Great Britain
Filed Jan. 18, 1962, Ser. No. 167,101
Claims priority, application Great Britain Jan. 31, 1961
1 Claim. (Cl. 248—361)

The object of the invention is to provide an improved form of lashing anchorage, for use in the freight stowage compartments of aircraft and other vehicles, whereby objects may be secured to points on the floor, but which can be removed when not required so as to leave the floor unencumbered.

An anchorage according to the invention comprises a base adapted for permanent incorporation in the floor structure so that its surface is substantially flush with the floor surface, said base having a non-circular aperture, a housing adapted to be mounted on said base and to be locked thereto by the engagement of an undercut plug-like portion which, when in a given angular position relative to an axis normal to the floor surface, can be inserted through the base aperture but which cannot be retracted when the housing is partially rotated from said position, means for locating the housing in such partially rotated position, a swivel fitting mounted in said housing for rotation about said axis, and a swivel link or shackle pivoted on said swivel fitting.

The link, the fitting and the housing may be removed as a unit from the base by releasing the said locating means, so that said unit may be rotated until the plug-like portion of the housing is in registration with the aperture of the base, when the unit may be withdrawn leaving the floor clear.

Figure 1:
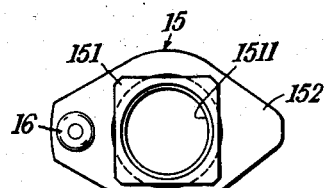
Figure 2:
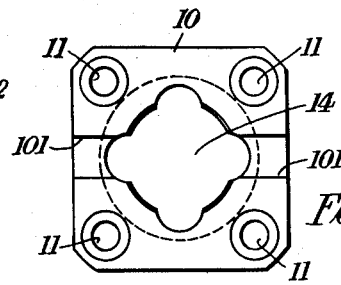
Figure 3:
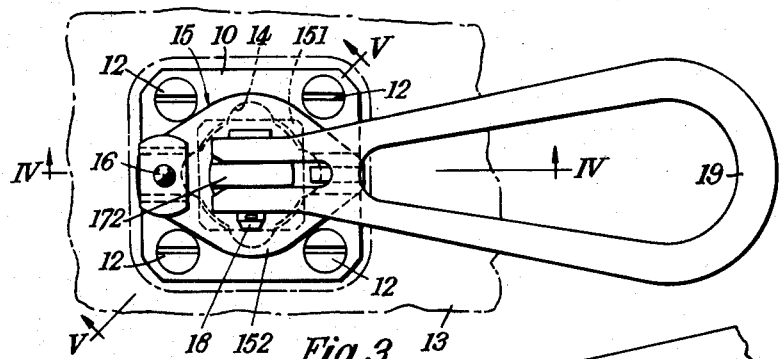
Figure 4:
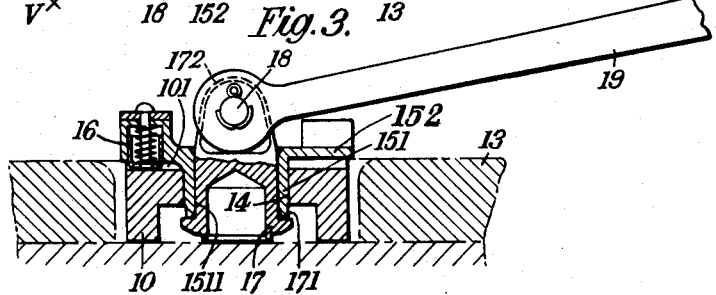
Figure 5:
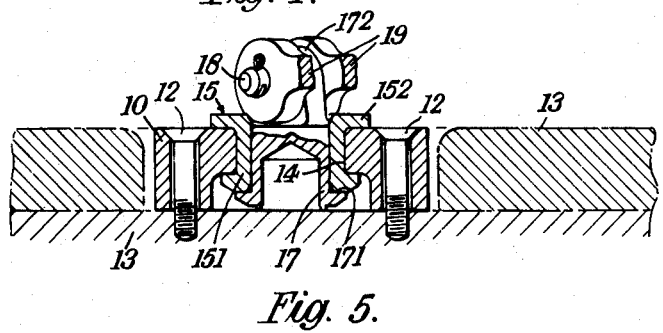

An embodiment of the invention, as applied to a freight lashing anchorage more particularly intended for the floor of a stowage compartment in an aircraft fuselage or the like is illustrated in and is hereinafter described with reference to the accompanying drawings, in which:

FIG. 1 is an underside plan of the housing,
FIG. 2 is a plan of the base,
FIG. 3 is a plan of the complete anchorage assembly, and
FIGS. 4 and 5 are respectively sections on the lines IV—IV and V—V in FIG. 3.

Referring to said drawings, it will be seen that the base of the anchorage is a plate 10, of substantially square plan form, being drilled at 11, 11 to receive bolts or setscrews 12 by which it may be fixed permanently in the floor structure 13 of the aircraft in a position such that the upper surface of the plate 10 and the upper surface of the floor 13 are co-planar. The base plate 10 has a central aperture 14 which is of the same general non-circular shape as the periphery of the plug-like portion 151 of the housing 15 for which the base serves as a mounting.

Said housing 15 is primarily intended to provide a bearing in which the swivel fitting may be rotatably mounted, and the plug-like portion 151 of the housing is accordingly bored at 1511 to a clearance fit for such fitting. The housing 15 is provided with a flange 152 which normally rests upon the upper face of the base; in an off-set part of said flange 152 is mounted a spring-pressed plunger 16 which is ordinarily urged downwardly to engage with a slot 101 which is provided in the upper surface of the base plate 10. The housing is mounted by turning it so that the plug-like portion 151 registers with the non-circular aperture 14 in the base and pressing it downwards until the flange 152 rests upon the latter. The housing 15 is then rotated through, say, 45 degrees to bring the downwardly pressed plunger opposite the slot 101 in the base plate 10 to enter the same and so locate the housing in locked engagement with the base.

The swivel fitting consists simply of a cylindrical member 17 which is received in the bearing bore 1511 of the housing 15, a shoulder 171 on the lower end of said member 17 abutting against the under face of the housing portion 151 to prevent relative axial displacement. On its upper end the member 17 has an upstanding lug 172 which is pierced to receive a pivot pin 18 for the swivel link 19.

To remove the anchorage the pin 16 is withdrawn from engagement with the slot 101, and the housing is rotated through an angle until the plug-like portion 151 registers with the aperture 14, when the anchorage may be lifted out of the base which is left clear of parts projecting above floor level.

I claim:
A lashing anchorage for permanent incorporation in a floor structure of the type that includes a floor surface in the midst of which is a well bottomed by a subsurface, comprising a base of height substantially equal to said well, means for securing said base to said well subsurface to cause the upper surface of said base to be substantially flush with said floor surface, said base having an endless non-circular aperture having an undercut surface, a housing including a plug-like portion movable into and out of said aperture to an axis normal to the said floor surface and having means contacting said undercut surface when the housing is partially rotated from said position for preventing removal of said portion from said aperture, means excluding said aperture for locating and releasably locking the housing in such partially rotated position, a swivel fitting mounted in said housing for rotation about said axis, and a swivel link or shackle pivoted on said swivel fitting, including for said swivel fitting a swivel mounting comprising in said plug-like portion a bore centered on said axis.

References Cited in the file of this patent
UNITED STATES PATENTS

| | | |
|---|---|---|
| 2,052,914 | Williams | Sept. 1, 1936 |
| 2,736,272 | Elsner | Feb. 28, 1956 |
| 2,743,684 | Elsner | May 1, 1956 |
| 2,786,428 | Arnold | Mar. 26, 1957 |
| 2,859,710 | Elsner | Nov. 11, 1958 |
| 2,891,490 | Elsner | June 23, 1959 |